United States Patent [19]
Buzsaki

[11] Patent Number: 6,138,253
[45] Date of Patent: Oct. 24, 2000

[54] METHOD AND APPARATUS FOR REPORTING ERRORS IN A COMPUTER SYSTEM

[75] Inventor: George Buzsaki, Fremont, Calif.

[73] Assignee: Oracle Corporation, Redwood Shores, Calif.

[21] Appl. No.: 08/865,333

[22] Filed: May 29, 1997

[51] Int. Cl.[7] .................................................. G06F 11/00
[52] U.S. Cl. .............................. 714/48; 714/47; 714/801
[58] Field of Search ............................... 395/185.01, 188, 395/183.01, 183.02; 340/525; 714/38, 4, 11, 13, 2, 42–57, 25, 800, 801; 371/37.1; 370/229; 380/4

[56] References Cited

U.S. PATENT DOCUMENTS

| | | | |
|---|---|---|---|
| 4,503,535 | 3/1985 | Budde et al. ............................. | 371/11 |
| 4,766,746 | 8/1988 | Henderson et al. ..................... | 379/103 |
| 4,932,026 | 6/1990 | Dev et al. . | |
| 5,113,393 | 5/1992 | Kam et al. . | |
| 5,319,353 | 6/1994 | Ohnishi et al. ......................... | 340/525 |
| 5,483,637 | 1/1996 | Winokur et al. ................... | 395/183.02 |
| 5,513,191 | 4/1996 | Takechi et al. ........................ | 371/37.1 |
| 5,619,644 | 4/1997 | Crockett et al. ......................... | 714/45 |
| 5,673,390 | 9/1997 | Mueller ..................................... | 714/57 |
| 5,742,753 | 4/1998 | Nordsieck et al. ................ | 395/182.09 |
| 5,748,880 | 5/1998 | Ito et al. .................................... | 714/46 |
| 5,809,012 | 9/1998 | Takase et al. ........................... | 370/229 |
| 5,948,107 | 9/1999 | Ramanathan ............................... | 714/2 |
| 5,974,568 | 10/1999 | McQueen .................................. | 714/38 |
| 5,982,893 | 11/1999 | Huges ......................................... | 380/4 |

*Primary Examiner*—Reba I. Elmore
*Assistant Examiner*—Mai Rijue
*Attorney, Agent, or Firm*—Blakely, Sokoloff, Taylor & Zafman, LLP

[57] ABSTRACT

A mechanism is provided for reporting errors in a computer system. The mechanism detecting an error in the computer system. The mechanism identifies a first error message associated with the error and a second error message associated with the error. The first error message and the second error message are then reported by the mechanism. The error messages provide different details regarding the error such that the first error message provides a general description of the error and the second error message provides a detailed description of the error. The mechanism is capable of displaying the first error message and the second error message on the computer system. The first error message can be associated with a first software module and the second error message can be associated with a second software module. An error message stack is used to store the first error message and the second error message.

30 Claims, 10 Drawing Sheets

METHOD AND APPARATUS FOR REPORTING ERRORS IN A COMPUTER SYSTEM

FIELD OF THE INVENTION

The present invention relates to error-reporting systems and, more specifically, systems capable of providing multiple error messages in response to a single error.

BACKGROUND

Computer systems typically generate a single error message when an error or other failure occurs. The error message generated may be reported by storing the error message in a data file, displaying the error message to a user of the system, or triggering an alarm or other mechanism for indicating that an error occurred. The error message may indicate that a hardware failure occurred or that a particular operation cannot be performed.

In existing systems, a single error message is generated to inform the system user as to the cause or source of the error. These existing systems generally use one of two different approaches in reporting or displaying error messages. One approach generates an error message that is very general (e.g., "cannot save" or "unable to access device"). These general error messages are relevant in that they inform the user that the selected function or operation cannot be performed. However, general error messages do not identify the source or cause of the error, which is necessary to properly diagnose and correct the problem.

Another approach to error reporting provides a detailed error message (e.g., "bad sector" or "incorrect driver software version"). These detailed error messages identify the source of the error or problem, but do not provide information as to how the error relates to the function or operation that the user tried to invoke.

Thus, both approaches discussed above fail to provide complete error reporting to the user of the system. It is therefore desirable to provide a system that provides more complete error reporting, which allows a user of the system to identify the source of the error or problem as well as identify the relevance of the error to the function or operation that the user tried to invoke.

SUMMARY OF THE INVENTION

Embodiments of the present invention provide a system for generating multiple error messages in response to a single error. The multiple error messages provide varying amounts of detail regarding the error, ranging from a general description of the error to a detailed description of the error.

An embodiment of the invention provides a system that detects an error in a computer or similar device. The system identifies a first error message associated with the error and a second error message associated with the error. The system then reports the first error message and the second error message.

In a particular embodiment of the invention, the first error message and the second error message are displayed in a manner such that the error messages progress from a general description of the error to a detailed description of the error.

In another embodiment, the first error message is associated with a first software module and the second error message is associated with a second software module.

Various embodiments of the invention use an error message stack to store the first error message and the second error message.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

The present invention is related to an error-reporting system that is capable of providing multiple error messages in response to a single error. Embodiments of the present invention provide a range of error messages to identify and describe the error that occurred as well as the cause of the error. For example, a high-level message can be provided which describes the overall error that occurred, such as "could not save." Additionally, more detailed error messages are also provided for the same error to identify the cause of the error, such as the reasons that the requested save operation could not be completed. This use of multiple error messages allows the user to trace the error and determine the cause and effects of the error.

The multiple error messages are generated by a hierarchy of software modules (also referred to as software functions or software routines). As discussed in greater detail below, embodiments of the invention use a stack error messaging system to compile the multiple error messages. Error messages are generated by each module, and identify the problems that occurred with respect to that particular module. Thus, the multiple error message system provided by the present invention generates a more "complete" profile of the error that occurred.

Figure 1:
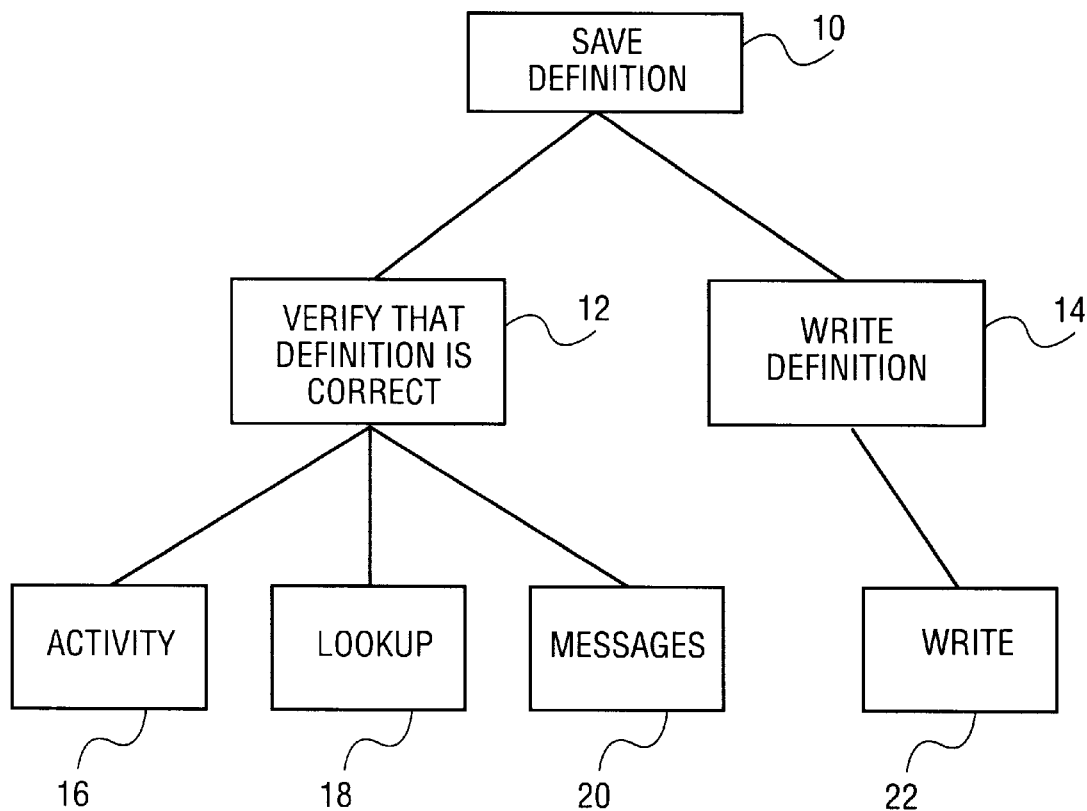
FIG. 1 illustrates an embodiment of a hierarchy of multiple software modules.

Referring to FIG. 1, an embodiment of a hierarchy of multiple software modules is illustrated. The highest level module illustrated in FIG. 1 is a "save definition" module 10. Module 10 may be invoked by a user of the system or may be invoked by the system itself. When module 10 is invoked, it also invokes sub-modules 12 and 14. Module 12 verifies that the definition to be saved at module 10 is a correct definition. Module 14 prepares the definition to be written to a storage device, memory device, or similar storage mechanism. Module 12 includes three sub-modules 16, 18, and 20. The results of modules 16, 18, and 20 are used by module 12 to determine whether the definition to be saved is a correct definition. For example, module 16 determines whether the activity described in the definition to be saved is a proper activity. Module 18 performs a lookup to determine whether the parameters or other information contained in the definition are correct. Module 20 determines whether the format of the message to be saved is correct.

If any one of the verification sub-modules 16, 18, or 20 identifies an error or other problem with the definition to be saved, then module 12 will generate an error message indicating that the definition is not correct. Additionally, each module 16, 18, or 20 that identified an error will generate an error message identifying the error. In this example, module 10 will not issue the appropriate commands to write the definition to the storage device. Instead, the various error messages generated by modules 10, 16, 18, or 20 will be reported or displayed to the system user to identify the error.

Module 14 includes a sub-module 22, which performs the actual write of the definition to the desired storage device if the definition is properly verified by module 12. If module 22 identifies an error or other problem writing the definition to the storage device, then module 22 and module 14 will each generate error messages identifying the error that occurred.

Figure 2:
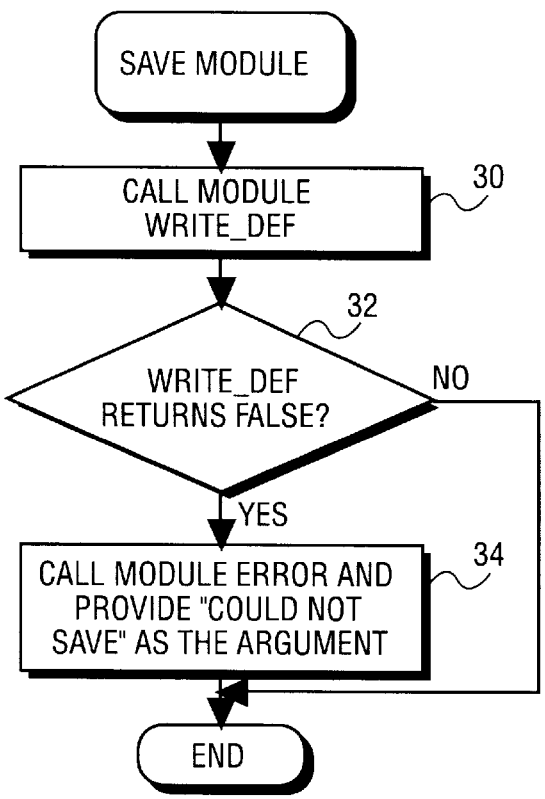
FIGS. 2–5 illustrate exemplary flow diagrams of procedures performed by various modules.
Figure 3:
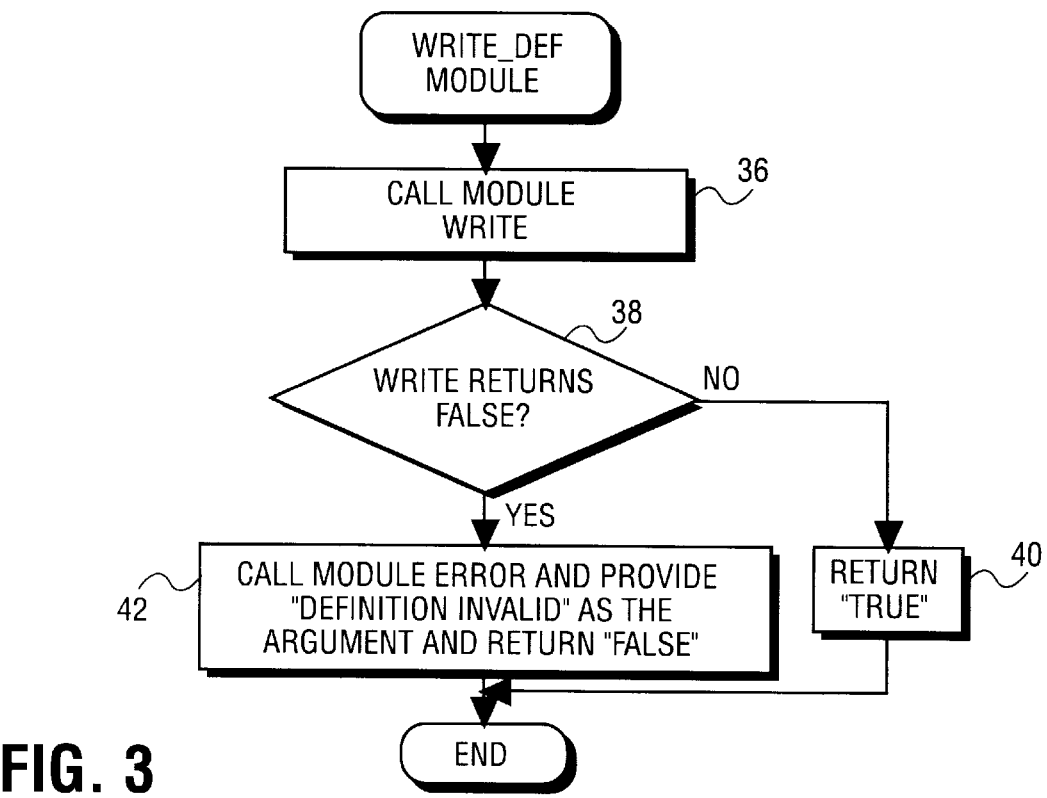
Figure 4:
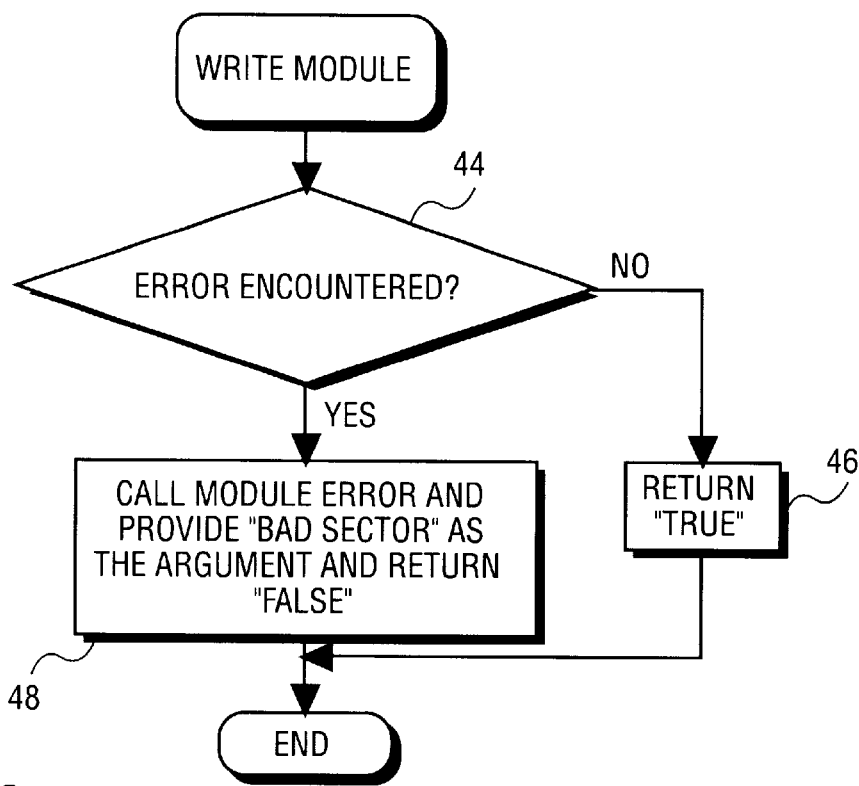

FIG. 2 illustrates an exemplary flow diagram of a procedure performed by SAVE module 10, described in FIG. 1. FIGS. 3 and 4 will describe exemplary procedures for implementing the WRITE_DEF module 14 and WRITE module 22. At step 30 in FIG. 2, the SAVE module calls the WRITE_DEF module. At step 32, the procedure determines whether the WRITE_DEF module returns a true value or a false value. If WRITE_DEF returns a false value, then the procedure continues to step 34 where an ERROR module is called and the argument "could not save" is provided to the ERROR module. The ERROR module is called each time a module encounters an error. The argument passed to the ERROR module will be used, in combination with arguments received from other modules, to identify the error. If the WRITE_DEF module returns true in step 32, then the procedure terminates without generating an error message (i.e., the procedure does not call the ERROR module).

FIG. 3 illustrates an exemplary flow diagram of a procedure performed by the WRITE_DEF module. At step 36, the WRITE module is called. Step 38 determines whether the WRITE module returns a true value or a false value. If the WRITE module returns true, then the procedure branches to step 40 where the WRITE_DEF module returns "true" to the calling module (in this case, the SAVE module). If step 38 of FIG. 3 identifies that the WRITE module returns false, then the procedure continues to step 42 where the ERROR module is called with the argument "definition invalid." Additionally, step 42 returns "false" to the calling module (in this case, the SAVE module).

FIG. 4 illustrates an exemplary flow diagram of a procedure performed by the WRITE module. At step 44, the procedure determines whether an error was encountered in attempting to write the data (in this case, a definition to be saved) to the desired storage device. If no error is encountered, then the procedure branches from step 44 to step 46 and returns "true" to the calling module. If an error is encountered at step 44, then the procedure continues to step 48 where the ERROR module is called and the argument "bad sector", for example, is passed to the ERROR module. Additionally, the procedure returns "false" to the calling module (in this case, the WRITE_DEF module).

Figure 5:
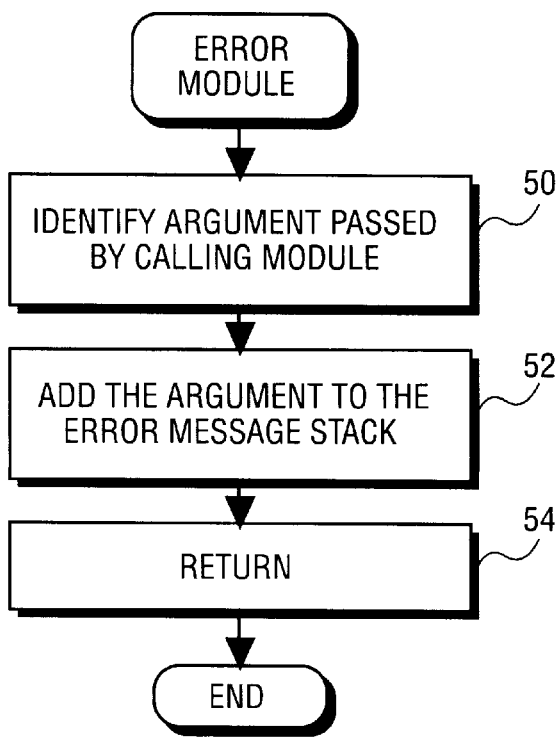

FIG. 5 illustrates an exemplary flow diagram of a procedure performed by the ERROR module. At step 50, the ERROR module identifies the argument passed by the calling module. The argument passed by the calling module is the error message to be added to an error message stack (discussed below). At step 52, the argument passed by the calling module is added to the error message stack. At step 54, the ERROR module returns to the calling module.

Figure 6A:
FIGS. 6A–6C illustrate an example error message stack as the error messages are added to the stack.
Figure 6B:
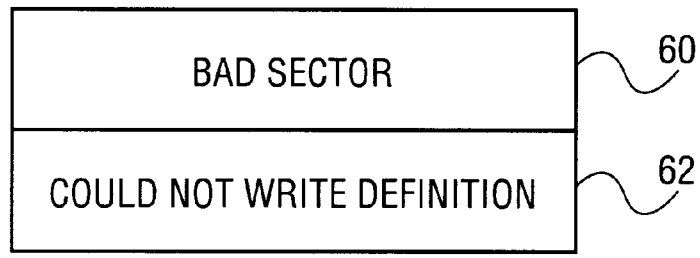
Figure 6C:
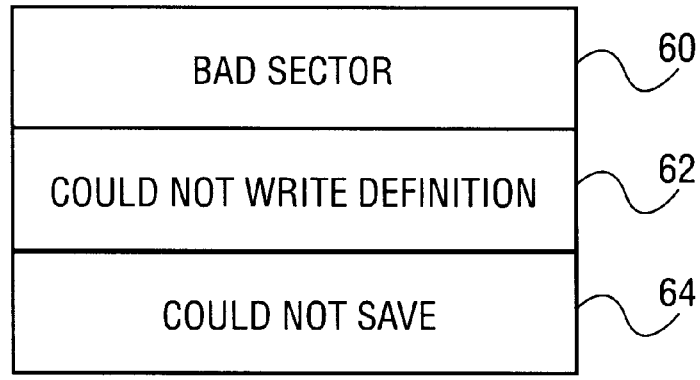

FIGS. 6A–6C illustrate an example error message stack as error messages are added to the stack by various modules. As shown in FIG. 2, the SAVE module calls the WRITE_DEF module. Next, the WRITE_DEF module calls the WRITE module (FIG. 3, step 36). The WRITE module then determines whether an error was encountered in writing the definition to the storage device (FIG. 4, step 44). In this example, assume that an error was encountered by the WRITE module when attempting to write the definition to the storage device. In this situation, the ERROR module is called with the argument "bad sector." This causes the error message "bad sector" to be added to the error message stack. In this example, the "bad sector" message is the first message added to the error message stack and is identified as entry 60, shown in FIG. 6A.

After the WRITE module has called the ERROR module at step 48 of FIG. 4, the WRITE module returns "false" to the calling module (the WRITE_DEF module). Thus, at step 38 of FIG. 3, the WRITE_DEF module identifies the "false" return and, at step 42, calls the ERROR module with the argument "could not write definition." As shown in FIG. 6B, a new entry 62 is added to the error message stack to identify the "could not write definition" error message generated by the WRITE_DEF module.

Next, the WRITE_DEF module returns "false" to the calling module (the SAVE module). At step 32 of FIG. 2, the SAVE module identifies the "false" return, and proceeds to step 34 to call the ERROR module with the argument "could not save." As shown in FIG. 6C, the error message stack is updated to include an entry 64 that identifies the "could not save" error message generated by the SAVE module. Thus, the single error identified in attempting to write the definition to a storage device generates three separate error messages, one from module 22, one from module 14, and one from module 10.

In an embodiment of the invention, the error messages contained in the error message stack are presented to the user of the system in the reverse order. Thus, the ordering is from a general error message to a specific, or more detailed error message. For example, the general message "could not save" is provided first, followed by more detailed information identifying that the system could not write the definition, which is followed by more details indicating a bad sector in the storage device. All three error messages are reported (e.g., displayed) simultaneously to the user of the system.

Figure 7:
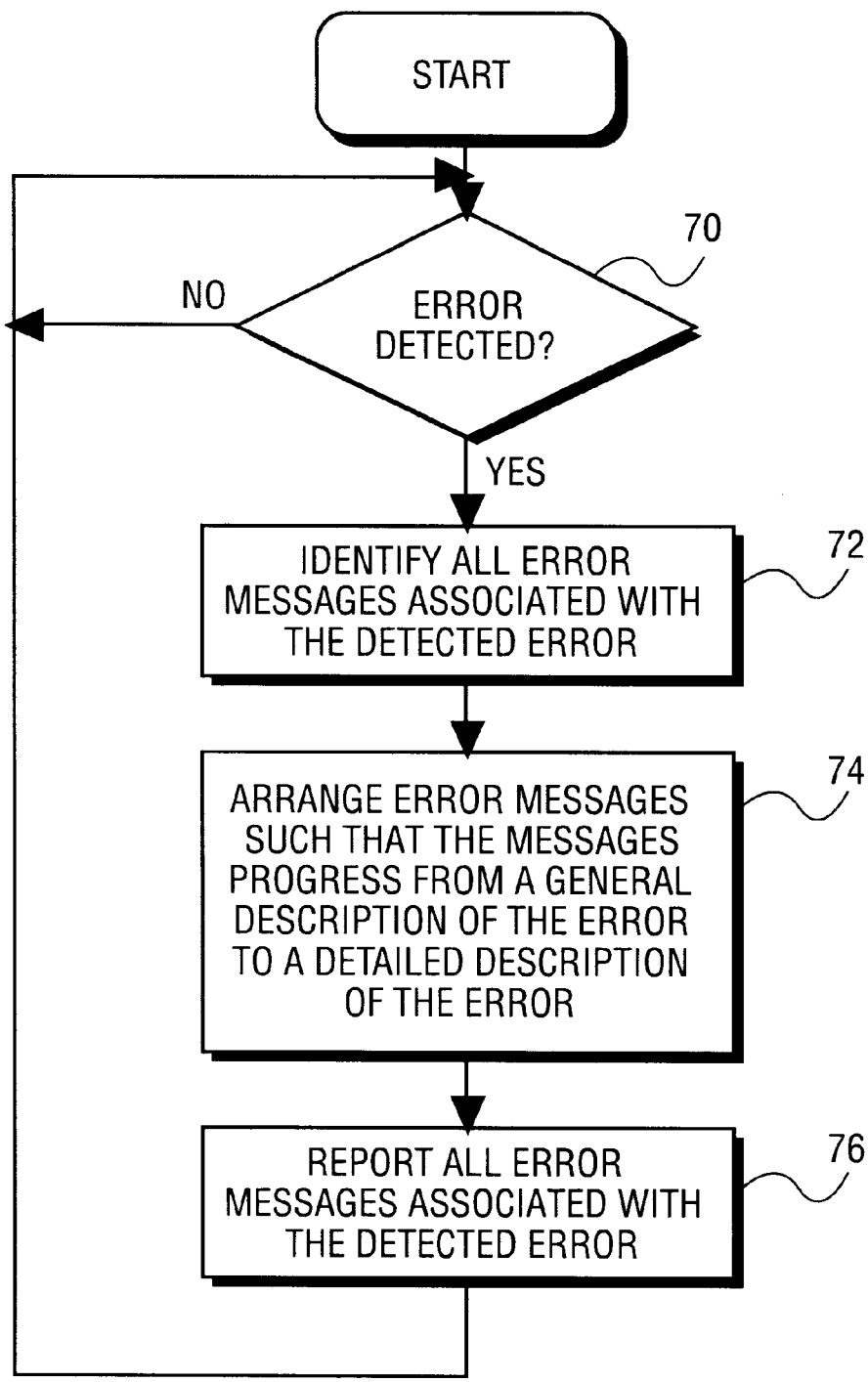
FIG. 7 is a flow diagram illustrating an embodiment of a procedure for identifying and displaying multiple error messages.

FIG. 7 is a flow diagram illustrating an embodiment of a procedure for identifying and displaying multiple error messages. At step 70, the procedure determines whether an error has been detected. If an error has not been detected, then the procedure returns to step 70 to await the detection of the next error. When an error has been detected, the procedure continues from step 70 to step 72 to identify all error messages associated with the detected error. As discussed above, each module is capable of generating its own error message. Therefore, step 72 identifies error messages associated with each module that generated an error message (i.e., the error messages in the error message stack).

Step 74 of FIG. 7 arranges the error messages identified in step 72 such that the messages progress from a general description of the error to a detailed description of the error. In the example discussed above, the error message stack shown in FIG. 6C is arranged in reverse order, such that the error messages are ordered from a general description to a detailed description of the error. Step 76 of FIG. 7 reports all error messages associated with the detected error. This reporting may include writing the contents of the error message stack to a storage device, memory device, printing device, or generating an alarm or other signal identifying an error. Additionally, the reporting of error messages in step 76 may include displaying the error messages to the user of the system. After reporting the error messages at step 76, the procedure returns to step 70 to await the next error detection.

Figure 8:
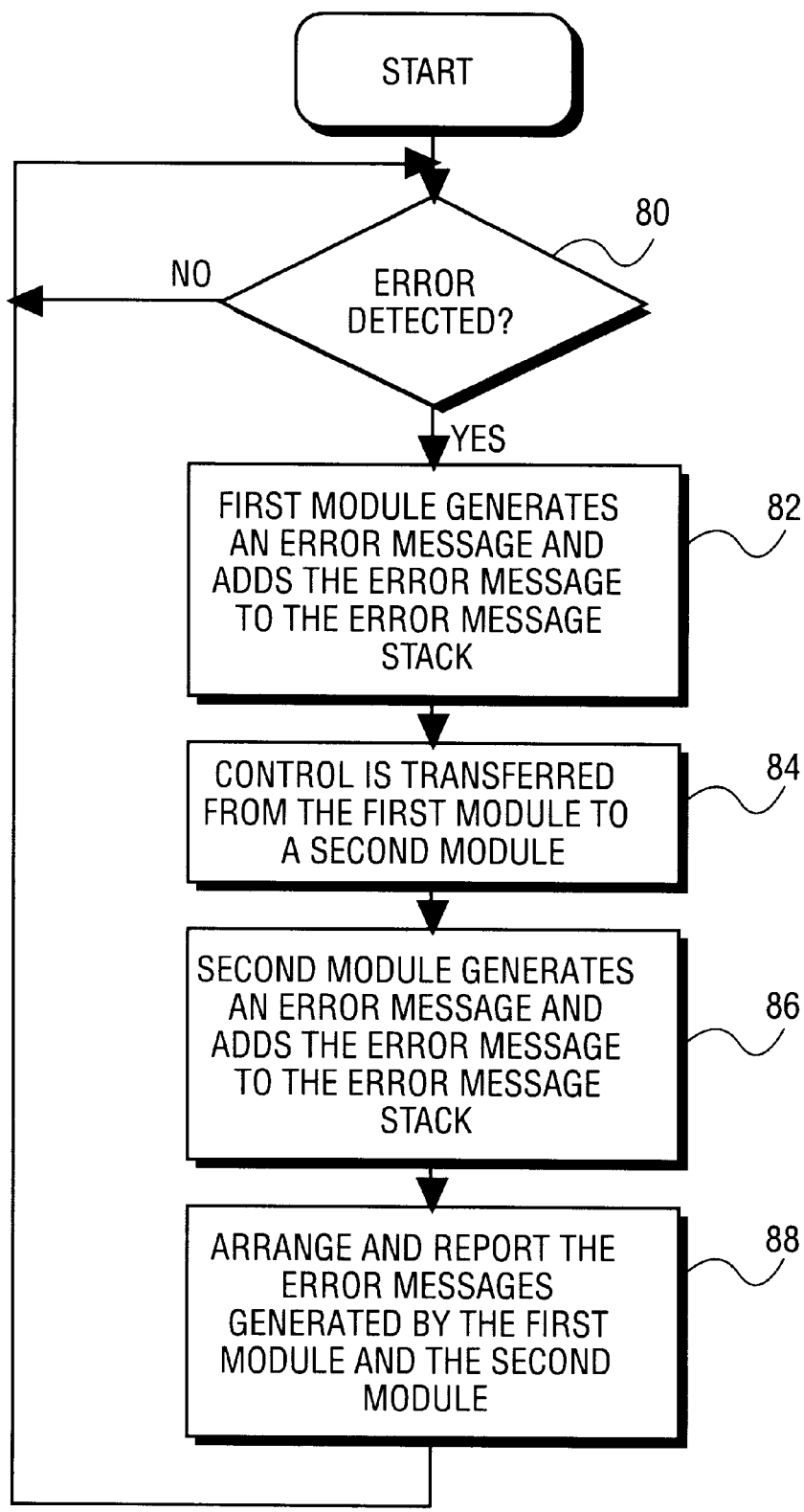
FIG. 8 is a flow diagram illustrating another embodiment of a procedure for identifying and displaying multiple error messages.

FIG. 8 is a flow diagram illustrating another embodiment of a procedure for identifying and displaying multiple error messages. At step 80, the procedure determines whether an error has been detected. If an error has not been detected, then the procedure returns to step 80 to await the detection of the next error. When an error is detected, the procedure continues from step 80 to step 82 where a first module generates an error message and adds the error message to the error message stack (e.g., by calling the ERROR module). At step 84, control is transferred from the first module to a second module. At step 86, the second module generates an error message and adds the error message to the error message stack. At step 88, the error messages generated by the first module and the second module are arranged and reported in the manner discussed above with respect to FIG. 7. Although FIG. 8 describes the generation of two error messages, it will be appreciated that various embodiments of the invention may report any number of error messages generated by any number of modules. FIG. 8 describes a particular embodiment in which two error messages are generated by two separate modules.

Figure 9A:
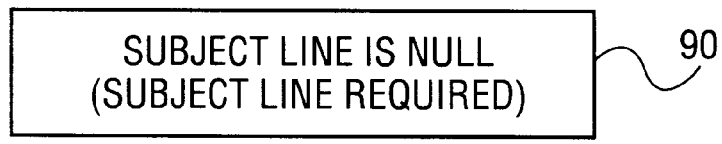
FIGS. 9A–9C and 10A–10E illustrate example error message stacks as error messages are added to the stacks.
Figure 9B:
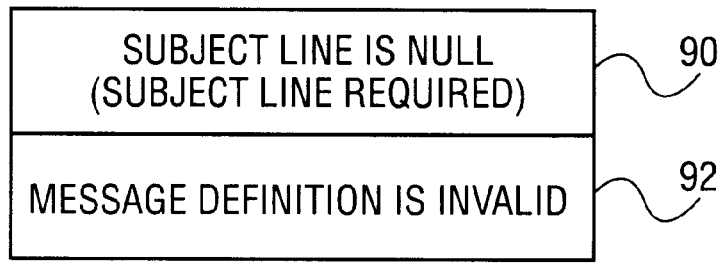
Figure 9C:
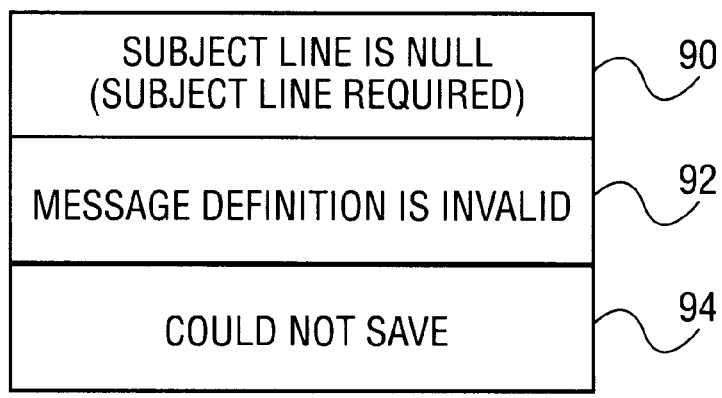

FIGS. 9A–9C illustrate an example error message stack as error messages are added to the stack by the ERROR module. In this example, the hierarchy of multiple software modules illustrated in FIG. 1 will be used to describe the generation of various error messages. A save procedure is invoked, causing module 10 to call module 12, which then calls modules 16, 18, and 20. In this example, an error is detected in module 20. The error occurred because the definition to be saved failed to include a subject line (e.g., a subject line in an e-mail message). In this example, the subject line is a required element of the definition to be saved.

When module 20 identifies the missing subject line, it calls the ERROR module with an argument "subject line is null (subject line required)." The ERROR module adds this error message to the error message stack shown in FIG. 9A as error message 90. Module 20 then returns a "false" message to calling module 12. The "false" return by module 20 causes module 12 to call the ERROR module with the argument "message definition is invalid." This error message is added to the error message stack shown in FIG. 9B as error message 92.

Module 12 then returns "false" to the calling module 10, thereby causing module 10 to call the ERROR module using the argument "could not save." As shown in FIG. 9C, the ERROR module adds this error message to the error message stack as error message 94. At this point, the error messages contained in the error message stack (as illustrated in FIG. 9C) are arranged and reported in the manner discussed above with respect to FIG. 7.

Figure 10A:
Figure 10B:
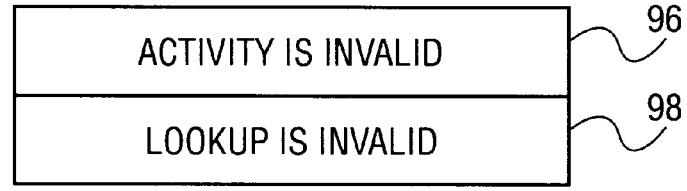

FIGS. 10A–10E illustrate another example of an error message stack as error messages are added to the stack. In this example, the hierarchy of FIG. 1 is used again, but each module 16, 18, and 20 identifies an error in the definition to be saved. Therefore, each module 16, 18, and 20 adds a specific error message to the error message stack. FIG. 10A illustrates the first error message 96 in the error message stack. Error message 96 is generated by activity module 16, after determining that the activity is invalid. FIG. 10B illustrates the error message stack after the second error message 98 has been added by lookup module 18. Module 18 generates the error message by calling the ERROR module with the "lookup is invalid" argument after determining that the definition to be saved contains invalid lookup information.

Figure 10C:
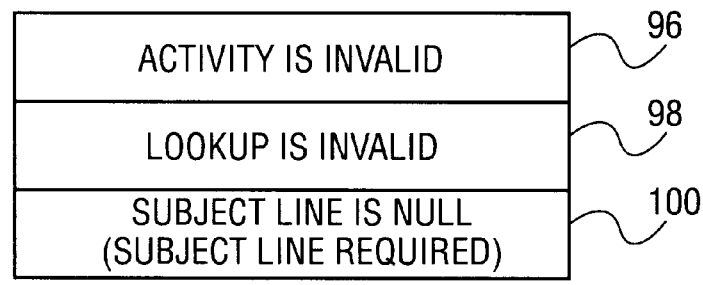
Figure 10D:
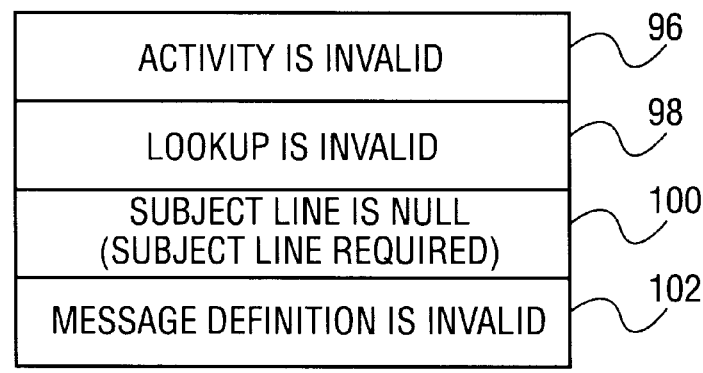
Figure 10E:
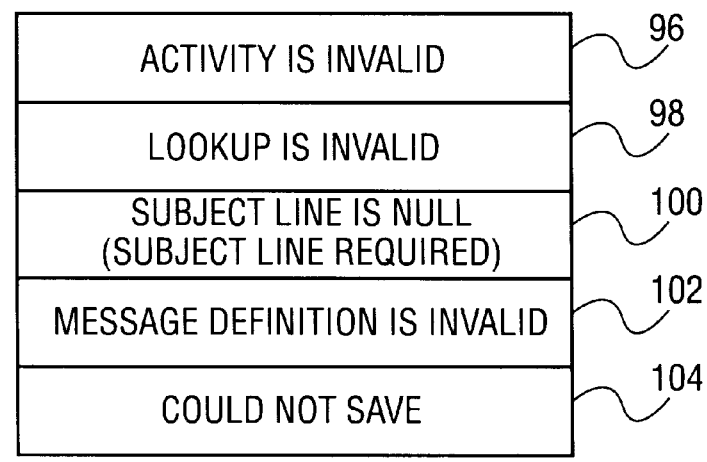
Figure 11A:
FIGS. 11A–11E illustrate another example of an error message stack that uses markers as the error messages are added to the stack.
Figure 11B:
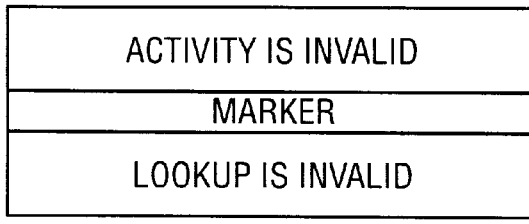
Figure 11C:
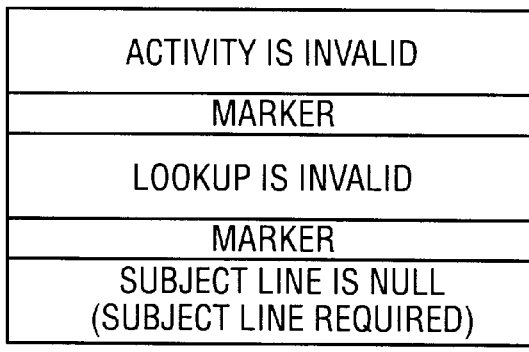
Figure 11D:
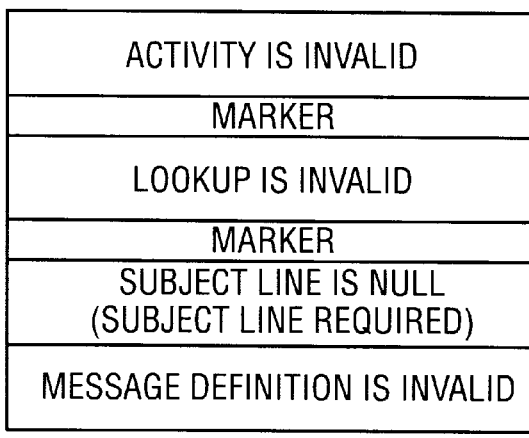
Figure 11E:
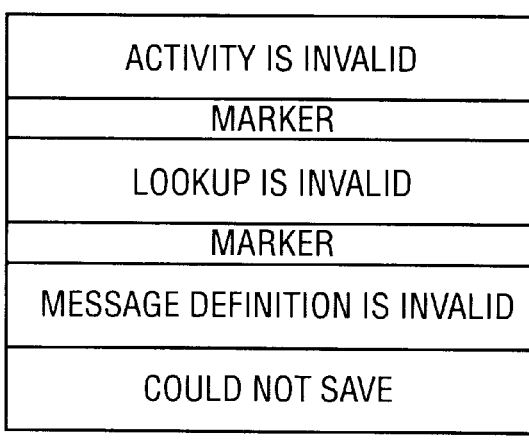

FIG. 10C illustrates the error message stack after entry of the third error message 100, generated by module 20. Error message 100 is generated due to the missing subject line, as discussed above with respect to FIGS. 9A–9C. FIG. 10D illustrates the error message stack after entry of the fourth error message 102, generated by module 12. Similarly, FIG. 10E illustrates the error message stack after entry of the fifth error message 104, generated by module 10. At this point, the error message stack may be arranged and reported (e.g., displayed) to the user of the system.

FIGS. 11A–11E illustrate another example of an error message stack that inserts markers into the error message stack as the error messages are added. The actual error messages entered in the error message stack shown in FIGS. 11A–11E are the same as those illustrated in FIGS. 10A–10E. However, in FIGS. 11A–11E, a marker 108 is located between each pair of messages that are generated by modules on the same "level." For example, modules 16, 18, and 20 are all located on the same "level" of the hierarchy of modules. Similarly, modules 12 and 14 are located on the same "level." By inserting marker 108 between error messages generated by modules on the same level, the reporting system or user of the system is able to determine that multiple errors occurred at the same level. These multiple errors contributed to the error message generated by the module at the next higher level.

In the hierarchy of FIG. 1, any one of the errors identified by modules 16, 18, and 20 will cause an error message to be generated by module 12. However, by inserting markers between the error messages generated by modules 16, 18, and 20, an indication is provided that three separate error messages were found on the same level, any one of which would have caused an error in the overall operation invoked. This complete error reporting information permits faster correction of the errors, since all errors are identified at the same time.

Various modules (e.g., SAVE and WRITE_DEF) have been provided above as examples for purposes of explaining the invention. However, any module or function can be written or modified to implement the teachings of the invention. For example, a module can be written such that when an error is detected by the module, the module calls an ERROR module and provides an argument representing the error message to be added to an error message stack. When a particular module (e.g., a SAVE module) detects an error based on information provided from one or more submodules, an error reporting module is activated to report the various error messages stored in the error message stack.

Figure 12:
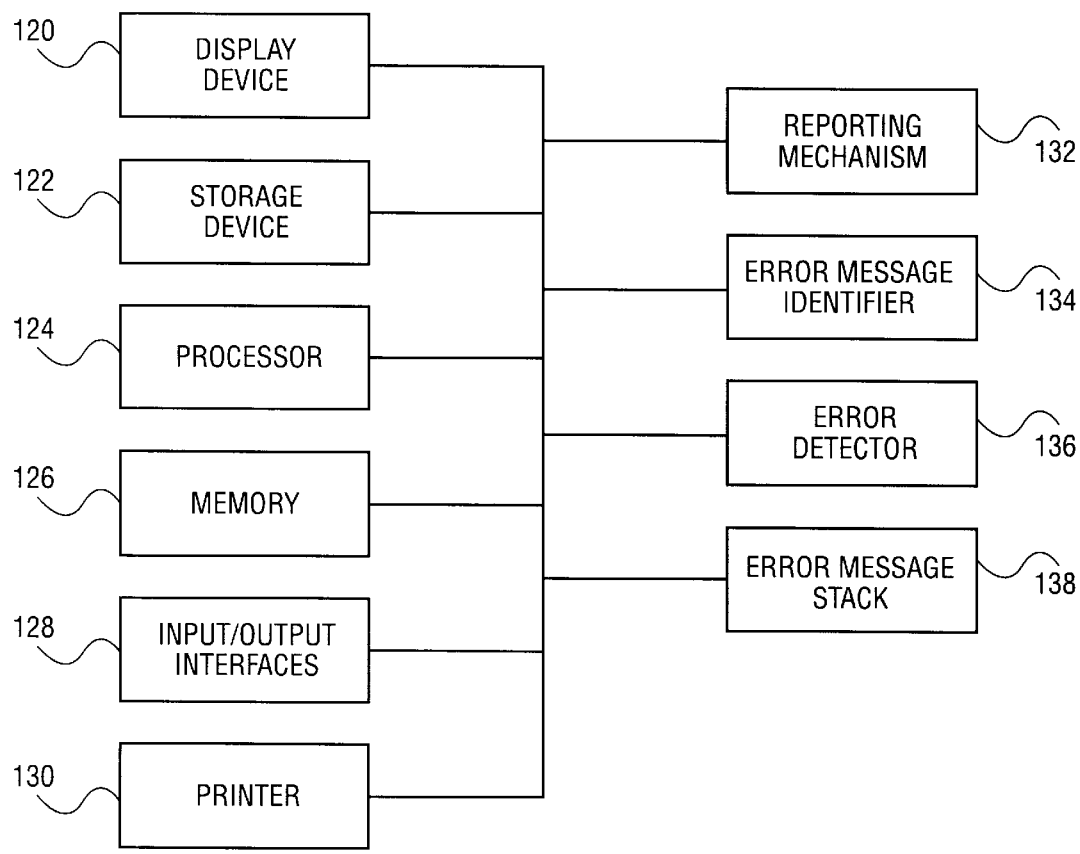
FIG. 12 illustrates an embodiment of a processor-based system capable of implementing the teachings of the present invention.

FIG. 12 illustrates an embodiment of a processor-based system capable of implementing the teachings of the present invention. A display device 120 and a storage device 122 are coupled to a processor 124. Storage device 122 may be any type of storage device, including a magnetic storage devices or an optical storage device. A memory 126 is coupled to processor 124 and may include various types of memory, such as random access memory (RAM), read-only memory (ROM), cache memories, and other memory storage devices. One or more input/output interfaces 128 are coupled to processor 124 and permit the communication of information to or from external devices coupled to interface 128. Interface 128 allows these external devices to communicate with processor 124 and the other components of the processor-based system shown in FIG. 12. A printer 130 is also coupled to processor 124 and is capable of producing a hard copy of information stored in or generated by the processor-based system.

A reporting mechanism 132 is coupled to the system components and is capable of reporting information contained in an error message stack 138, or other storage mechanism. An error message identifier 134 and an error detector 136 are also coupled to the processor-based system and are used to detect and identify various error messages. Error message identifier 134 is also capable of calling an ERROR module for adding error messages to error message stack 138.

Although FIG. 12 illustrates various system components coupled to a single bus or communication link, it will be appreciated that a particular processor-based system may include multiple buses and multiple communication links between various components of the system. Furthermore, reporting mechanism 132, error message identifier 134, error detector 136, and error message stack 138 are illustrated as separate components in the processor-based system. However, particular implementations of the system may incorporate these four modules into one or more modules. Additionally, any of the modules 132, 134, 136, and 138 may be incorporated into another system component, such as storage device 122, processor 124, or memory 126.

Embodiments of the present invention may include code sequences, instructions, parameters, and other information stored on a processor-readable medium (or computer-readable medium). The code sequences, instructions, parameters, and other information are used to perform various data processing and data management operations, such as the procedures described above. The processor-readable medium may be any type of magnetic, optical, or electrical storage medium including a disk, diskette, CD-ROM, memory device, or similar storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for reporting errors in a computer system, the method comprising the steps of:

detecting an error;

identifying a first error message associated with the error, the first error message identifying an operation invoked by a user, the operation not being completed because of the error;

identifying a second error message associated with the error, the second error message including information about a failure that caused the error; and reporting the first error message and the second error message to provide varying amounts of detail regarding the error.

2. The method of claim 1 wherein the first error message provides a general description of the error and the second error message provides a detailed description of the error.

3. The method of claim 1 wherein the step of reporting the first error message and the second error message includes displaying the first and second error messages on the computer system.

4. The method of claim 3 wherein the first error message and the second error message are displayed in a manner such that the error messages progress from a general description of the error to a detailed description of the error.

5. The method of claim 1 wherein the first error message is associated with a first software module and the second error message is associated with a second software module.

6. The method of claim 1 wherein the first error message and the second error message are stored in an error message stack.

7. A method for reporting errors in a computer system, the method comprising the steps of:

detecting an error;

identifying a plurality of error messages associated with the error, wherein the plurality of error messages provide varying amounts of detail regarding the error, the plurality of error messages including a first error message that identifies an operation invoked by a user, the operation not being completed because of the error, and a second error message that identifies a failure that caused the error; and reporting the plurality of error messages.

8. The method of claim 7 wherein at least one of the plurality of error messages provides a general description of the error and at least one of the plurality of error messages provides a detailed description of the error.

9. The method of claim 7 wherein the step of reporting the plurality of error message includes displaying the plurality of error messages on the computer system.

10. The method of claim 7 wherein the plurality of error messages are reported in a manner such that the error messages progress from a general description of the error to a detailed description of the error.

11. The method of claim 7 wherein the plurality of error messages are stored in an error message stack.

12. The method of claim 7 wherein the plurality of error messages are generated by a hierarchy of software modules.

13. The method of claim 12 wherein each software module is configured to generate an error message in response to detection of an error by the software module.

14. A method for reporting errors in a computer system, the method comprising the steps of:

detecting an error in a first module;

the first module generating a first error message, the first error message identifying an operation invoked by the user, the operation not being completed because of the error;

transferring control from the first module to a second module in response to the error;

the second module generating a second error message, the second error message including information about a failure that caused the error; and reporting the first error message and the second error message to provide varying amounts of detail regarding the error.

15. The method of claim 14 wherein the first error message provides a general description of the error and the second error message provides a detailed description of the error.

16. The method of claim 14 wherein the step of reporting the first error message and the second error message includes displaying the first and second error messages on the computer system.

17. The method of claim 16 wherein the first error message and the second error message are displayed in a manner such that the error messages progress from a general description of the error to a detailed description of the error.

18. The method of claim 14 wherein the first error message and the second error message are stored in an error message stack.

19. An apparatus for reporting errors in a computer system, the apparatus comprising:

an error detector;

an error message identifier coupled to the error detector, wherein the error message identifier is configured to identify a plurality of error messages associated with an error, the plurality of error messages including a first error message that identifies an operation invoked by a user, the operation not being completed because of the error, and a second error message that identifies a failure that caused the error; and a reporting mechanism coupled to the error message identifier and configured to report the plurality of error messages associated with the error to provide varying amounts of detail regarding the error.

20. The apparatus of claim 19 wherein the reporting mechanism displays the plurality of error messages on the computer system.

21. The apparatus of claim 19 wherein the reporting mechanism displays a subset of the plurality of error messages on the computer system.

22. The apparatus of claim 19 wherein the reporting mechanism reports the plurality of error messages in a manner such that the error messages progress from a general description of the error to a detailed description of the error.

23. The apparatus of claim 19 further including an error message stack configured to store the plurality of error messages associated with the error.

24. A computer software product including a medium readable by a processor, the medium having stored thereon a sequence of instructions which, when executed by the processor, causes the processor to:

detect an error in a first module;

generate a first error message from the first module, the first error message identifying an operation invoked by the user, the operation not being completed because of the error;

transfer control from the first module to a second module in response to the error;

generate a second error message from the second module, the second error message including information about a failure that caused the error; and report the first error message and the second error message to provide varying amounts of detail regarding the error.

25. The computer software product of claim 24 wherein the first error message provides a general description of the error and the second error message provides a detailed description of the error.

26. The computer software product of claim 24 wherein the first error message and the second error message are reported in a manner such that the error messages progress from a general description of the error to a detailed description of the error.

27. The computer software product of claim 24 wherein the first error message and the second error message are stored in an error message stack.

28. A method for reporting errors in a computer system, the method comprising the steps of:

detecting an error;

identifying a first error message associated with the error, the first error message including information about an operation causing the error;

identifying a second error message associated with the error, the second error message including information about a source of the error;

retaining said first and second error messages in a stack;

arranging said stack in a sorted order from a most general error message to a most specific error message; and reporting the first error message and the second error message, the most general error message being reported first.

29. An apparatus for reporting errors in a computer system, the apparatus comprising:

an error detector;

an error message identifier coupled to the error detector, wherein the error message identifier is configured to identify a plurality of error messages associated with an error, the plurality of error messages including information about an operation causing the error and a source of the error;

an error message stack configured to retain the plurality of error messages in sorted order from a most general error message to a most specific error message; and a reporting mechanism coupled to the error message identifier and the error message stack and configured to report the plurality of error messages associated with the error, the most general error message being reported first.

30. A computer software product including a medium readable by a processor, the medium having stored thereon a sequence of instructions which, when executed by the processor, causes the processor to:

detect an error in a first module;

generate a first error message from the first module, the first error message including information about an operation causing the error;

transfer control from the first module to a second module in response to the error;

generate a second error message from the second module, the second error message including information about a source of the error;

retain said first and second error messages in a stack;

arrange said stack in a sorted order from a most general error message to a most specific error message; and report the first error message and the second error message, the most general error message being reported first.

* * * * *